May 31, 1949. W. J. O'BRIEN 2,471,648
EQUISIGNAL RADIO BEACON SYSTEM
Original Filed March 2, 1942 2 Sheets-Sheet 1
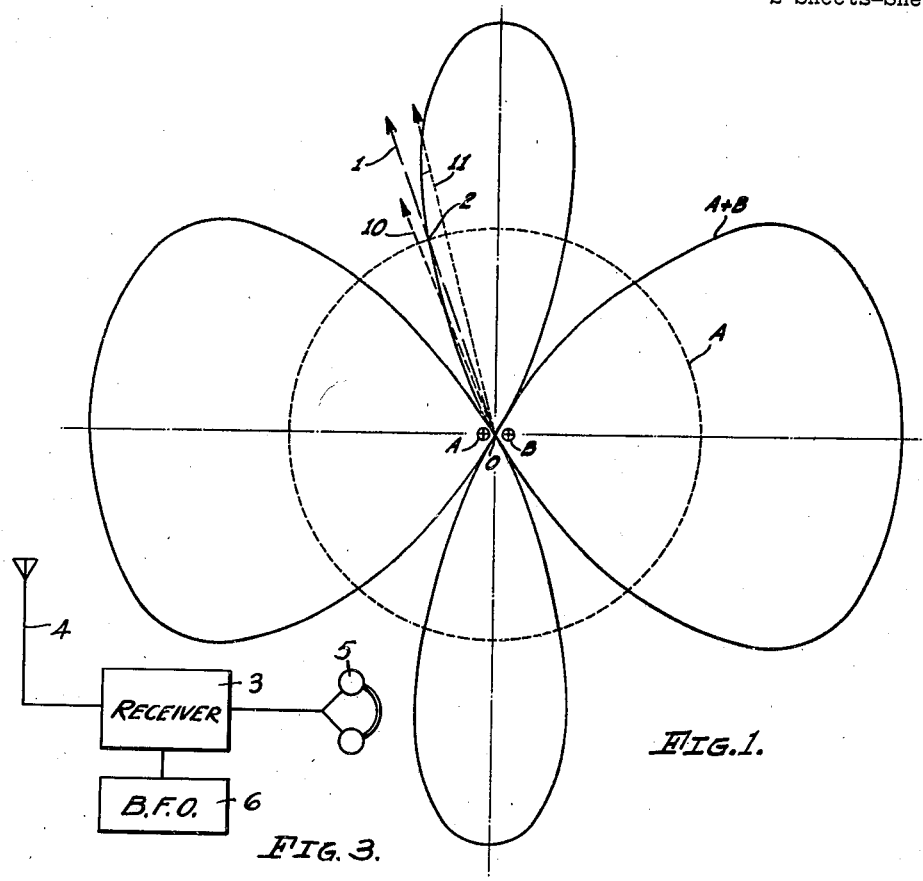
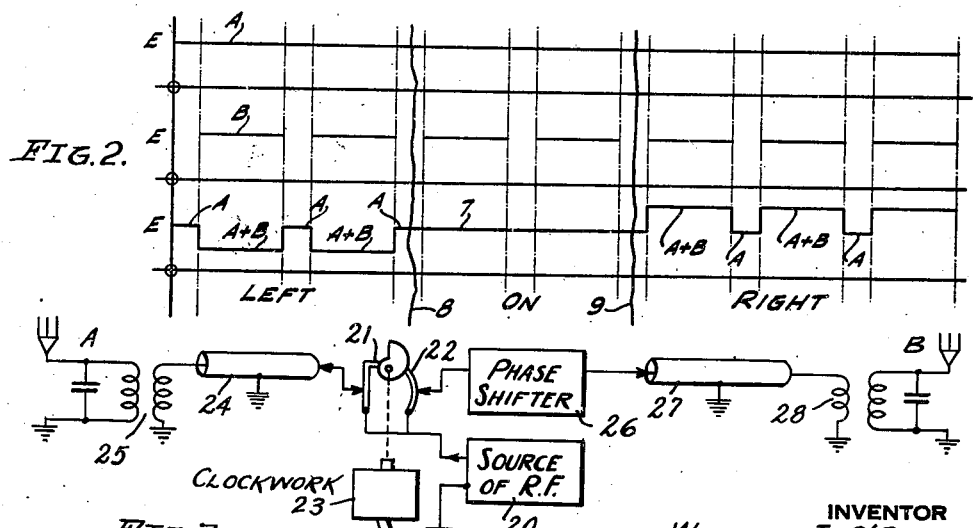
INVENTOR
WILLIAM J. O'BRIEN,
BY
Harold W. Mattingly
ATTORNEY.

May 31, 1949.  W. J. O'BRIEN  2,471,648
EQUISIGNAL RADIO BEACON SYSTEM
Original Filed March 2, 1942  2 Sheets-Sheet 2

INVENTOR
WILLIAM J. O'BRIEN,
BY
ATTORNEY

Patented May 31, 1949

2,471,648

UNITED STATES PATENT OFFICE 2,471,648

EQUISIGNAL RADIO BEACON SYSTEM

William J. O'Brien, London, England, assignor to The Decca Record Company, Limited, London, England, a corporation of Great Britain Original application March 2, 1942, Serial No. 432,948. Divided and this application November 8, 1943, Serial No. 509,445

9 Claims. (Cl. 343—110)

My invention relates to a radio beacon system and has particular reference to an equi-signal type of radio beacon which finds particular utility when employed as a navigation aid for vehicles and conveyances, particularly aircraft.

This is a division of my copending application Serial No. 432,948, filed March 2, 1942, and entitled "Equisignal radio beacon systems" (now Patent No. 2,406,396).

The equi-signal type of radio beacon system is that which is at present employed in the United States Department of Commerce airways radio-range beacon for establishing the transcontinental air routes followed by the commercial air transport companies. This type of system generally comprises a group of radio transmission antennae so arranged and so operated that the course along which it is desired to navigate an aircraft comprises the locus of points of equal signal intensities as regards separate signals of like frequency emanated from the antennae. In general, these separate signals are reciprocally and distinguishably keyed "off" and "on," the conventional arrangement being that in which one signal is keyed with the International Morse Code character for A (. —) while the other is alternately keyed N (— .). If the aircraft is "on course" the intensities of the two signals are equal and the off periods of one coincide with the on periods of the other so that a steady and continuous signal is received. If the plane is "off course," one of the signals will predominate over the other and the keying of the signals will be apparent. The direction in which the plane has drifted from the course is indicated by whether the A or N signal predominates.

The present systems while of great assistance in the navigation of aircraft, nevertheless are characterized by certain disadvantages and difficulties. For example, the present systems do not provide a sufficiently sensitive indication to permit their successful application to long range control, as for example, the guiding of bombing planes in war time to an objective to be bombed situated five or six hundred miles distant. The sensitivity of the present system can be increased by increasing the antenna spacing. There are, however, practical limitations on how far apart the antennae may be successfully spaced and, furthermore, an increase in antenna spacing likewise increases the number of equi-signal courses produced so that the danger of an aircraft becoming lost through inability to identify the course is correspondingly increased.

It is, therefore, an object of my invention to provide an equi-signal type of radio beacon system which overcomes the above noted disadvantages by providing for increased sensitivity of indication.

It is an additional object of my invention to provide a radio beacon system of the character set forth in the preceding paragraphs which is characterized by a novel and simplified keying arrangement for producing the "on course" and "off course" signals.

Other objects and advantages of my invention will be apparent from a study of the following specifications, read in connection with the accompanying drawings, wherein:

Fig. 1 is a diagrammatic view illustrating by means of curves drawn on a polar coordinate system the relative signal intensities produced by two radio transmission antennae when operated as hereinafter described, and illustrating also the manner in which these separate signal intensities operate to define an equi-signal course;

Fig. 2 is a diagrammatic view illustrating the mode of operation of the two antennae indicated in Fig. 1, and illustrating also the way in which such operation produces an indication of the location of a vehicle with respect to the course defined by the system;

Fig. 3 is a diagrammatic view representing a suitable type of receiving apparatus;

Fig. 7 is a diagram showing one form of transmitting apparatus which may be used in the practice of the invention.

Figure 4:
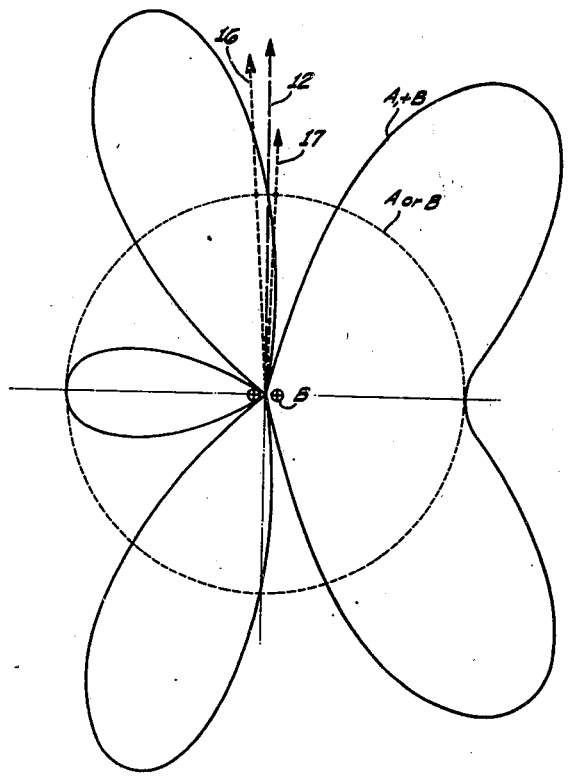
Fig. 4 is a polar diagram similar to Fig. 1 but illustrating the result of operating the antennae A and B by a different mode of operation.

Referring to the drawings, I have illustrated in Fig. 1 two radio transmission antennae A and B as being spaced from each other a known distance. Fig. 1 illustrates by means of the solid line curve A+B the field pattern which is produced when the antennae A and B are spaced apart a distance corresponding to one wavelength and are operated simultaneously in phase and at identical frequencies. The dotted circle A in Fig. 1 represents the field strength produced when the antenna A is alone excited.

These two field patterns operate to define a plurality of equi-signal courses along which the signals emanated from antenna A alone are equal in intensity to the combined signals emanated by the simultaneous operation of antennae A and B. One such course is indicated by the dashed arrow 1 in Fig. 1. It will be noted this course extends from an origin O disposed on a line extending through the antennae A and B a midway between said antennae and through a point 2 comprising the intersection of the curve A+B with the circle A. At any point along the "on course" line 1 the signals A+B are equal in intensity to the signal produced by the operation of antenna A alone.

This phenomenon may be employed to guide a vehicle or conveyance such as an aircraft to a chosen destination by so positioning the antennae A and B that the equi-signal line 1 extends through the selected destination and by providing the vehicle with suitable radio receiving apparatus tuned to receive the signals emanating from the antennae A and B. Such a receiving apparatus is diagrammatically illustrated in Fig. 3 as comprising a conventional radio frequency receiver 3 provided with an antenna 4 for receiving the radiation from the antennae A and B and coupled to a suitable indicating device such as a loud speaker or headphones 5. It is preferred to transmit from antennae A and B unmodulated signals and to provide a beat frequency oscillator 6 which is so coupled to the receiver 3 as to produce in the headphones 5 an audible beat note resulting from receiving the signals from either of the antennae A and B.

In order for the pilot or driver of the vehicle to be able to ascertain whether or not he is proceeding along one of the equi-signal courses such as the course 1 it is necessary to provide some means permitting him to identify those changes in the relative amplitudes of the two types of signals received which result from the deviation of the vehicle from the selected course. I have illustrated in Fig. 2 the manner in which this result can be achieved by appropriate control of the radiation of energy from the antennae A and B.

Fig. 2 comprises a rectangular diagram in which the uppermost portion illustrates the mode of operation of one of the antennae such as antenna A. This antenna is operated continuously and without interruption. Antenna B is, however, preferably keyed "off" and "on" as illustrated by the central portion of Fig. 2. Preferably the "on" periods are substantially three times as long as the "off" periods. The lowermost portion of Fig. 2 indicates the type of signal which is provided in the headphones 5.

By referring to Fig. 1 it will be noted that when the vehicle is "on course," the signals emanating from the antenna A during the "off" periods of the antenna B operation are equal in intensity to the signals resulting from the simultaneous operation of antennae A and B. Thus there is received in the headphones 5 a steady and unchanging signal such as that indicated by the straight horizontal line 7 in that portion of Fig. 2 bounded by the wavy break lines 8 and 9. If, however, the vehicle deviates to the left of the equi-signal course 1 so as to follow a course such as that, for example, indicated by the dotted line 10 in Fig. 1, the signal which is emanated from antenna A alone will predominate in intensity over the signals produced by the simultaneous operation of antennae A and B.

The signal thus reproduced by the headphones 5 is illustrated diagrammatically in Fig. 2 and particularly in that portion lying to the left of the wavy break line 8. By reference to this portion of Fig. 2, it will be noted that the A signals predominate over the A+B signals and that the A signals have a time duration which is materially less than the duration of the A+B signals. This renders the signals distinguishable by the pilot of the vehicle and such a pilot obtains the impression of hearing a series of spaced dot signals. Conversely, if the vehicle deviates to the right of the equi-signal course 1 as, for example, along a course indicated by the dotted line 11 in Fig. 1, the signals produced by the simultaneous operation of antennae A and B will predominate in intensity over the signals resulting from the operation of antenna A alone.

This condition is illustrated in Fig. 2 in that portion lying to the right of the wavy break line 9. By reference to this portion of Fig. 2 it will be noted that the A+B signals not only predominate in intensity over the A signals, but also are characterized by a time duration materially greater than the duration of the A signals. The pilot of the vehicle thus obtains the impression of hearing in the headphones 5 a series of dash signals.

Summarizing the foregoing it will be seen that the "on course" condition is indicated by a steady tone, whereas, a series of spaced dot signals indicates that the vehicle is to the left of the selected course, whereas, a series of spaced dash signals indicates that the vehicle is to the right of the selected course.

I have illustrated in Fig. 4 a modified equi-signal beacon system in which the antennae A and B, while spaced as in Fig. 1, namely, at a distance corresponding to one wavelength of the radio frequency energy radiated from the antennae, are so operated that the signals of one lead the other by 120 electrical degrees. This change in the phase relation between the signals emanated from the antennae A and B serves to shift the equi-signal course angularly to a position extending at right angles to the line joining the antennae A and B, such shifted equi-signal course being indicated by the dashed arrow 12 in Fig. 4.

By comparing Figs. 1 and 4 the manner in which the compass direction of the equi-signal course can be changed by merely changing the phase relation between the signals emanated from the antennae A and B is seen. As in Fig. 1, the solid curve in Fig. 4 illustrates the field strength pattern produced by the simultaneous operation of the antennae A and B, whereas, the dotted circle illustrates the field pattern produced by the operation of one of the antennae alone. With this form of the invention I prefer to employ the same type of receiving equipment as described in connection with Fig. 1.

While I have described the spacing of transmitters A and B as being one wavelength, it is to be understood that this spacing has been chosen for illustrative purposes only and that other spacings may be used as desired. However, I prefer to limit the proximity of the stations to at least one-half wavelength so that the number of equi-signal surfaces produced by the system will differ by no more than one from that number equalling eight times the spacing in wavelengths of the transmitting antennae. A spacing closer than one-half wavelength produces a pattern having an undesired kidney bean shape.

Figure 5:
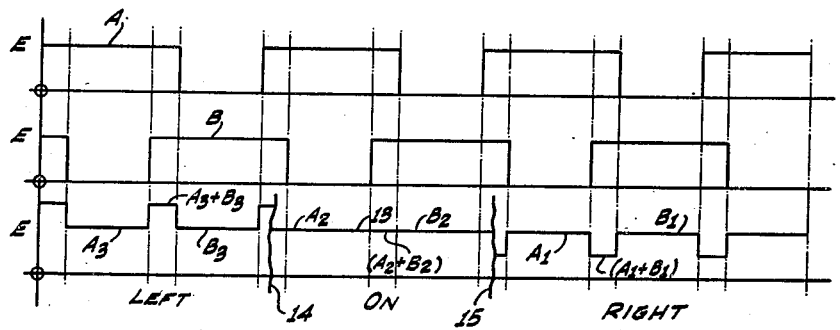
Fig. 5 is a diagrammatic view illustrating the manner in which the antennae A and B are operated, and illustrating also the manner in which the system operates to indicate to the pilot of a vehicle the location of the vehicle with respect to an equi-signal course defined by the beacon system.

Fig. 5, however, illustrates a different mode of operation of the antennae A and B for producing the desired indication of the location of the vehicle with respect to the equi-signal source 12. As is indicated by the uppermost portion of Fig. 5, antenna A is preferbly keyed "off" and "on" in such manner that the duration of the periods of energization of the antenna exceed the periods of de-energization. As is shown by the central portion of Fig. 5, antenna B is similarly operated but in staggered time relation to antenna A so as to provide three distinct periods of operation; namely, one in which antenna A alone is operated, another in which antennae A and B are simultaneously operated, and a third in which antenna B alone is operated.

When the vehicle is moving along the equi-signal course 12 a steady tone is produced in the headphones 5 by virtue of the fact that the signals resulting from the operation of antenna A alone, the operation of antenna B alone and the simultaneous operation of antennae A and B are all equal as indicated by the straight horizontal line 13 included in the lower portion of Fig. 5 between the wavy break lines 14 and 15.

By reference to Fig. 4 it will be noted that should the vehicle wander to the left of the course 12 as, for example, along a course such as that indicated by the dotted arrow 16 in Fig. 4, the signal received during the simultaneous operation of antennae A and B will predominate in intensity over the signals received from antennae A or B alone. By referring to that portion of Fig. 5 lying to the left of the wavy break line 14, it will be noted that the A+B signals exceed in intensity the A signals and the B signals. As is clearly illustrated therein, the keying of the A and B antennae is so arranged that the duration of the periods of simultaneous operation of the antennae is approximately one-third the duration of the periods in which each antenna is operated alone. Thus, the predominance of the relatively short A+B signal provides the pilot with the impression of hearing a series of spaced dot signals.

By reference to Fig. 4 and that part of Fig. 5 lying to the right of the wavy break line 15, it will be noted that the conditions are reversed when the vehicle wanders to the right of the course as, for example, along the course indicated by the dotted arrow 17 in Fig. 4. Under these circumstances the A and B signals predominate in intensity over the A+B signals and also have a duration substantially three times the duration of the A+B signals so that the pilot of the vehicle receives the impression of hearing a series of spaced dash signals. The indication given the pilot is thus the same as that given by the system described in connection with Figs. 1 and 2.

Figure 6:
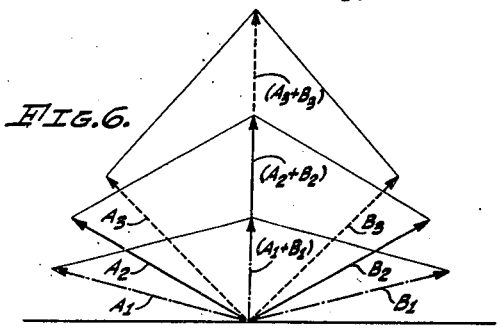
Fig. 6 is a vector diagram illustrating the manner in which the signals alternately produced by the system illustrated in Fig. 4 serve to produce suitable indications of the location of the vehicle with respect to the desired course.

Fig. 6 is a vector diagram illustrating the phase relationships between the signals which are responsible for the shift in predominance of the signals as the vehicle wanders from one side to the other of the selected course. It will be noted that any selected point on the equi-signal course 12 is equally distant from the antennae A and B so that the signals received at such point from these separate antennae bear the same phase relationship to each other as do the signals emanating from the antennae.

As before noted, the phase relation illustrated in Fig. 4 is that in which the signals emanated from antenna B lead the signals emanated by antenna A by 120 electrical degrees. This condition is illustrated by the vectors A2 and B2 in Fig. 6. The sum of these vectors is indicated by the vector bearing the reference character (A2+B2). It will be noted that this resultant vector is equal in length to the vectors A2 and B2 so that signals emanated from antenna A or antenna B are indistinguishable from the signal produced by the simultaneous operation of these antennae.

When the vehicle is moved to the left of the course 12 as, for example, to the course 16, the distance from the vehicle to the antenna A is shortened with respect to the distance to the antenna B so that at the location of the vehicle the B signals lead the A signals by an electrical angle less than the angle by which the signals emanated at the antenna B lead the signals emanated at the antenna A. This condition is illustrated by the vectors A3 and B3 in Fig. 6, the resultant of which is illustrated by the vector (A3+B3) which, it will be noted, has a magnitude considerably greater than that of the signals A3 and B3.

Similarly, a shift of the vehicle to the right of the equi-signal course 12 increases the phase angle between the signals, in which case the signals may be represented by the vectors A1 and B1 in Fig. 6. The sum of these vectors is indicated by the vector (A1+B1) which, it will be noted, discloses a magnitude materially less than the magnitude of the signals A1 and B1.

I have diagrammatically illustrated in Fig. 7 one form of apparatus which may be used to energize antennae A and B as hereinbefore described and which may include a suitable source 20 of radio frequency energy. The source 20 is coupled to a pair of cam-operated switches 21 and 22 arranged to be driven by a clockwork 23 or other suitable timing mechanism, the cam operator for the switches being arranged to open and close the switches 21 and 22 in accordance with the time cycle hereinbefore described. The switch 21 serves to periodically connect the source 20 to antenna A through a transmission line 24 and antenna coupling 25. The switch 22 serves to periodically connect the source 20 to antenna B through a phase shifter 26, transmission line 27 and antenna coupling 28. The phase shifter 26 is used to adjust the phase of the signals radiated from antenna B with respect to those radiated from antenna A for the purpose of adjusting the orientation of one or more of the equi-signal courses as hereinbefore explained.

In the foregoing, I have illustrated and described an improved form of equi-signal radio beacon system which is characterized particularly by its simplicity, ease of operation, and high degree of accuracy and sensitivity attained.

While I have shown and described the preferred embodiment of my invention, I do not desire to be limited to any of the details of construction shown or described herein, except as defined in the appended claims.

I claim:

1. The method of producing a radio frequency equi-signal surface for guiding mobile vehicles which consists in radiating radio frequency signals of like frequency from a pair of spaced points, and producing each of said signals intermittently in substantially identical repeating cycles of off and on periods with the on periods of one signal overlapping the on periods of the other signal for a time constituting a substantial fraction of the duration of said periods.

2. The method of producing a radio frequency equi-signal surface for guiding mobile vehicles which consists in radiating radio frequency signals of like frequency from a pair of spaced points, and producing each of said signals intermittently in substantially identical repeating cycles of off and on periods with the on periods of one signal overlapping the on periods of the other signal to such an extent that the time duration of the periods in which both signals are radiated is a substantial fraction of the time duration of said periods and materially different from the duration of the periods in which one signal only is radiated.

3. The method of producing radio frequency equi-signal surfaces for guiding mobile vehicles in any desired direction which consists in radiating radio frequency signals from a first position, periodically radiating radio frequency signals from a second position spaced from said first position a distance of at least one-half wavelength of said signals to produce a plurality of equi-signal surfaces, and adjusting the relative phase of said radiated signals to extend one of said equi-signal surfaces in said desired direction, whereby the number of equi-signal surfaces so produced differs by no more than one from that number equalling eight times the spacing in wavelengths of said radio frequency signals of said first position from said second position.

4. The method of producing a radio frequency equi-signal surface for guiding mobile vehicles which consists in radiating radio frequency signals of like frequency from a pair of spaced points, and producing each of said signals intermittently in repeating cycles of off and on periods with the on periods of both signals of equal duration and the on periods of one signal overlapping the on periods of the other signal.

5. The method of producing a radio frequency equi-signal surface for guiding mobile vehicles which consists in radiating radio frequency signals of like frequency from a pair of spaced points, and producing each of said signals intermittently in repeating cycles of off and on periods with the on periods of both signals of equal duration and the on periods of one signal overlapping the on periods of the other signal to such an extent that the time duration of the periods in which both signals are radiated is materially different from the duration of the periods in which one signal only is radiated.

6. A radio beacon system comprising a pair of antennae spaced from each other, means for radiating from said antennae radio frequency signals of like frequency, and means for cyclically interrupting the radiation from each of said antennae to produce each of said signals intermittently in repeating cycles of off and on periods with the on periods of one signal overlapping the on periods of the other signal for a time constituting a substantial fraction of the duration of said periods.

7. A radio beacon system comprising a pair of antennae spaced from each other, means for radiating from said antennae radio frequency signals of like frequency, and means for cyclically interrupting the radiation from each of said antennae to produce each of said signals intermittently in repeating cycles of off and on periods with the on periods of one signal overlapping the on periods of the other signal to such an extent that the time duration of the periods in which both signals are radiated in a substantial fraction of the time duration of said periods and materially different from the duration of the periods in which one signal only is radiated.

8. A radio beacon system comprising a pair of antennae spaced from each other, means for radiating from said antennae radio frequency signals of like frequency, and means for cyclically interrupting the radiation from each of said antennae to produce each of said signals intermittently in repeating cycles of off and on periods with the on periods of both signals of equal duration and the on periods of one signal overlapping the on periods of the other signal.

9. A radio beacon system comprising a pair of antennae spaced from each other, means for radiating from said antennae radio frequency signals of like frequency, and means for cyclically interrupting the radiation from each of said antennae to produce each of said signals intermittently in repeating cycles of off and one periods with the on periods of both cycles of equal duration and the on periods of one signal overlapping the on periods of the other signal to such an extent that the time duration of the periods in which both signals are radiated is materially different from the duration of the periods in which one signal only is radiated.

WILLIAM J. O'BRIEN.

REFERENCES CITED

The following references are of record in the file of this patent:

UNITED STATES PATENTS

| Number | Name | Date |
|---|---|---|
| 2,094,333 | Smith | Sept. 28, 1937 |
| 2,349,976 | Matsudaira | May 30, 1944 |

FOREIGN PATENTS

| Number | Country | Date |
|---|---|---|
| 705,481 | Germany | Mar. 27, 1941 |